United States Patent [19]

Schupp et al.

[11] Patent Number: 4,576,979
[45] Date of Patent: Mar. 18, 1986

[54] HEAT-CURABLE SURFACE-COATING AGENTS, AND THEIR USE

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 547,094

[22] Filed: Oct. 31, 1983

[30] Foreign Application Priority Data

Mar. 30, 1983 [DE] Fed. Rep. of Germany ....... 3311516

[51] Int. Cl.[4] .................. C08K 3/20; C08L 63/02
[52] U.S. Cl. .................. 523/404; 204/181.7; 428/418; 523/414; 523/415; 523/417; 523/424; 524/507; 524/901; 525/127; 525/128; 525/440; 525/457; 525/458; 525/481; 525/524; 525/528
[58] Field of Search ............. 523/414, 404, 415, 417, 523/424; 524/901, 507; 525/127, 128, 481, 504, 528, 524; 528/67, 85

[56] References Cited

U.S. PATENT DOCUMENTS 3,893,956  7/1975  Brandt ............................... 524/211
4,104,147  8/1978  Marchetti et al. ............. 204/181 C

FOREIGN PATENT DOCUMENTS 2419179  4/1974  Fed. Rep. of Germany .
2942488  10/1979  Fed. Rep. of Germany .
3021300  6/1980  Fed. Rep. of Germany .
1303480  1/1973  United Kingdom .

Primary Examiner—Theodore E. Pertilla
Attorney, Agent, or Firm—Keil & Weinkauf

[57] ABSTRACT

Heat-curable surface-coating agents useful not only for application as solvent-containing finishes and for powder coating but also, in their protonated form, for cathodic electrocoating contain, as a binder, a mixture of (A) a polyadduct, polycondensate or other polymer having an average molecular weight $\overline{M}_n$ of from 500 to 10,000 and, per molecule, on average two or more OH and/or primary and/or secondary amino groups and (B) a reaction product of (a) one or more polyisocyanates, (b) one or more secondary monoamines and, if appropriate, (c) one or more polyalcohols having two or more hydroxyl groups.

13 Claims, No Drawings

HEAT-CURABLE SURFACE-COATING AGENTS, AND THEIR USE

The invention relates to novel heat-curable surface-coating agents which harden without acid catalysis, namely not only to those heat-curable surface-coating agents which can be applied conventionally or by means of powder coating but also, in particular, to those which contain basic groups, so that they are water-dispersible on protonation with acids and can be applied by cathodic electrocoating.

German Published Application DAS No. 2,057,799 describes a process for the cathodic electrophoretic deposition of a water-dispersed ionic organic resin which comprises a positively charged amine-containing resin and a blocked multifunctional isocyanate. The blocking agents mentioned in said DAS are aliphatic or cycloaliphatic alcohols containing from 2 to 8 carbon atoms, phenol, caprolactam, a $C_2$–$C_8$–aliphatic amine and aliphatic amides. However, the said DAS makes no mention of reacting an isocyanate with a secondary aliphatic amine. While phenol and an aliphatic alcohol are employed as blocking agents in the examples of this application, only aliphatic alcohol is used in commercially available products for toxicological reasons. As a consequence, however, tin salts have to be added as crosslinking catalysts and, moreover, hardening has to take place at above 180° C., which causes yellowing.

It is an object of the present invention to eliminate these disadvantages, in particular to lower the baking temperature by a considerable amount and hence to cut energy costs.

We have found that this object is achieved by using reaction products of (a) one or more polyisocyanates, (b) one or more secondary monoamines and, if appropriate, (c) one or more polyalcohols having two or more hydroxyl groups, to prepare heat-curable surface-coating agents which harden at above 130° C. into hard, resilient films without any hardening catalyst having to be added.

Accordingly, the present invention relates to heat-curable surface-coating agents which contain, as a binder, a mixture of (A) a polyadduct, polycondensate or other polymer having an average molecular weight $\overline{M}_n$ of from 500 to 10,000 and, per molecule, on average two or more OH and/or primary and/or secondary amino groups and (B) a reaction product of (a) one or more polyisocyanates, (b) one or more secondary monoamines and, if appropriate, (c) one or more polyalcohols having two or more hydroxyl groups.

The components from which the novel heat-curable surface-coating agent is prepared will now be described in detail:

Component (A) can be a polyadduct, polycondensate or other polymer having an average molecular weight $\overline{M}_n$ of from 500 to 10,000 and selected from a very wide range of compound classes. The sole important point is that the polymeric compound has on average two or more OH and/or primary and/or secondary amino groups. Examples of suitable materials are polyesters, alkyd resins, polyethers, polyacrylate resins, polyurethanes, epoxy resins and their reaction products with alcohols, mercaptans or amines. A further suitable class of compounds are polydiene resins or oils, for example polybutadiene oils, into which OH groups can be introduced, for example by adding mercaptoethanol onto some of the double bonds. Another way of introducing OH groups into polybutadiene compounds is to react them with maleic anhydride, followed by reacting the product with OH-containing amines, such as ethanolamine or diethanolamine. The required derivatives can also be obtained by epoxidizing polybutadiene oils with per-acids and reacting the product with amines.

Suitable polyesters have an average molecular weight $\overline{M}_n$ of from 500 to 10,000 and a hydroxyl number of from 25 to 400 and are prepared from aliphatic and/or aromatic dicarboxylic acids of 4 to 10 carbon atoms, e.g. succinic acid, glutaric acid, adipic acid, pimelic acid, suberic acid, azelaic acid, sebacic acid, cyclohexanedicarboxylic acid, phthalic acid, isophthalic acid or terephthalic acid, or derivatives thereof, and polyhydric aliphatic diols, such as ethylene glycol, diethylene glycol, triethylene glycol, polyethylene glycol, propanediol, butanediol, hexanediol, neopentylglycol or neopentylglycol hydroxypivalate and, if appropriate, more than dihydric alcohols, such as trimethylolpropane, glycerol, erythritol, pentaerythritol, trimethylolbenzene or trishydroxyethyl isocyanurate.

Suitable alkyd resins have a similar structure, except that they contain one or more monocarboxylic acids, for example fatty acids. It is also possible to use alkyd resins which contain glycidyl esters of branched carboxylic acids.

Examples of suitable polyethers are aliphatic and araliphatic polyethers which are obtained by reacting dihydric and/or polyhydric alcohols with various amounts of ethylene oxide and/or propylene oxide.

Suitable polyacrylates are OH-containing polyacrylates having a hydroxyl number of from 25 to 500. They should have an acid number <25, preferably <10, and a Fikentscher K value (3% strength in acetone) of from 10 to 40, preferably from 12 to 25, and can contain the following monomers, for example, as polymerized units:

From 0 to 100% by weight, preferably from 20 to 40% by weight, of one or more OH- or NH-containing monomers, for example isopropylaminopropylmethacrylamide or hydroxy-($C_2$–$C_4$)-alkyl esters of an $\alpha,\beta$-ethylenically unsaturated carboxylic acid, for example 2-hydroxyethyl and hydroxypropyl (meth)acrylates or butanediol mono(meth)acrylate, from 0 to 90% by weight, preferably from 60 to 80% by weight, of one or more ethylenically unsaturated carboxyl- and hydroxyl-free compounds, for example vinylaromatics, such as styrene and vinyltoluene, vinyl esters of carboxylic acids of 2 to 18 carbon atoms, such as vinyl acetate and vinyl propionate, vinyl ethers of monoalkanols of 1 to 18 carbon atoms, such as vinyl methyl ether and vinyl isobutyl ether, esters of acrylic acid or methacrylic acid with $C_1$–$C_{12}$-monoalkanols, corresponding diesters of maleic acid, fumaric acid and itaconic acid, (meth)acrylamide, (meth)acrylonitrile, monomers with tertiary amino groups, such as diethylaminoethyl acrylate or diethylaminoethylamylamide, and mixtures thereof. Another way of obtaining basic acrylates is to use epoxy-carrying monomers, such as glycidyl methacrylate, and forming an adduct of the oxirane rings of the polymers with amines.

Examples of suitable polyurethanes are OH-containing polyurethanes which have a hydroxyl number of from 25 to 600 and are prepared from aliphatic and/or aromatic diisocyanates, e.g. from tetramethylene diisocyanate, hexamethylene diisocyanate, isophorone diisocyanate, diphenylmethane diisocyanate, toluylene diisocyanate, naphthylene diisocyanate, diphenyl ether 4,4'-diisocyanate, and any dimers or trimers which can be obtained therefrom, and aliphatic diols, such as ethylene glycol, diethylene glycol, triethylene glycol, polyethylene glycols, propanediol, butanediol, hexanediol, neopentylglycol or neopentylglycol hydroxypivalate and, if appropriate, more than dihydric alcohols, such as trimethylolpropane, glycerol, pentaerythritol, trimethylolbenzene or trishydroxyethyl isocyanurate.

Examples of suitable epoxy resins are glycidyl ethers of the type prepared from 2,2-bis-(4-hydroxyphenyl)-propane and epichlorohydrin. These epoxy resins can have been further modified, for example by having been reacted with polyfunctional alcohols or SH compounds. Examples of polyfunctional alcohols suitable for modifying the epoxy resins are ethylene glycol, propylene 1,2-glycol, propylene 1,3-glycol and butane-1,4-diol.

If it is desired to prepare relatively flexible coatings, the epoxy resins can also be modified with longchain polyfunctional alcohols or mercaptans. If the polyfunctional alcohols or mercaptans are used in more than equivalent amounts, based on the number of epoxy groups present, this gives products having terminal OH or SH groups. If, however, they are used in less than equivalent amounts, this gives products having terminal epoxy groups which may be reacted further. The mercaptans react with epoxy groups even in the absence of a catalyst, while the reaction of the alcohols requires the use of a catalyst, for example dimethylbenzylamine, and elevated temperatures, of from about 50° to 150° C.

Reaction products of epoxy resins with primary or secondary amines, in particular with hydroxyl-containing amines, e.g. ethanolamine, methylethanolamine and diethanolamine, can likewise be used as component (A).

If component (A) is a product which contains sufficient amino groups to be water-soluble or water-dispersible on protonation with acids, the product can be combined with component (B) to prepare water-dispersible binders for baking finishes, in particular cathodic electrocoating binders. The above reaction products of epoxy resins with primary or secondary amines can be used for this purpose.

Many of the carrier resins proposed for the cathodic electrocoating process can also be used as component (A) in the binders according to the invention, namely, for example, the reaction products of phenolic Mannich bases with epoxy resins as described in U.S. Pat. No. 3,994,989, the reaction products of chain-lengthened epoxy resins with secondary amines as described in U.S. Pat. No. 4,104,147, or reaction products of (meth)acrylamidomethylated phenols, amines and epoxy resins, for example as described in U.S. Pat. No. 4,336,116 and U.S. Pat. No. 4,340,714 as long as they have a molecular weight of from 500 to 10,000 and, per molecule, on average two or more OH and/or primary and/or secondary amino groups. Although the crosslinking activity in the course of baking is completely adequate if component (A) contains only OH and no primary and/or secondary amino groups, it is frequently advantageous to use products which also contain primary and/or secondary amino groups, since they can be used to prepare aqueous electrocoating baths of high pH, for example pH 6.5–8.0. A high pH, in particular a pH close to pH 7 or above, helps to prevent corrosion on the electrocoating equipment. One way of preparing products which have primary and secondary amino groups and which are suitable for use as component (A) is to react excess primary diamines with epoxy resins and then separate off the excess amine at elevated temperatures and under reduced pressure.

Diamines suitable for the above reaction are especially those which have from 2 to 6 carbon atoms, for example ethylenediamine, 1,2- and 1,3-diaminopropane, 1,4-diaminobutane and hexamethylenediamine. The reaction products can, if desired, be chain-lengthened with dicarboxylic acids, for example with sebacic acid or with a fatty acid dimer. The desired molecular weight can be set via the ratio of dicarboxylic acid to epoxy resin/amine adduct, for example by employing 1 mole of fatty acid dimer per two molecules of epoxy resin/amine adduct.

A further way of preparing such products with primary amino groups as are suitable for use as component (A) is to react epoxy resins with secondary amines which contain blocked primary amino groups. Examples of such amines are the diketimine of diethylenetriamine, the ketimine of aminoethylethanolamine and the ketimine of N-methylethylenediamine. The ketimines can be prepared in a simple manner from the free amines and a ketone, for example methyl isobutyl ketone, namely by separating water out of the refluxing reaction mixture. In the reaction with epoxy resins only the secondary amino group reacts, and subsequently the ketimine can be cleaved by adding water to re-form the free primary amino group. These products too can be flexibilized by reacting some of the primary amino groups with dicarboxylic acids to lengthen the chain.

Component (A) is generally present in the binder mixture according to the invention in an amount of from 30 to 95, preferably from 60 to 85, % by weight of the total amount of binder mixture.

Component (B) is a reaction product of (a) one or more polyisocyanates, (b) one or more secondary monoamines and, if appropriate, (c) one or more polyalcohols having two or more hydroxyl groups.

Any desired aliphatic, alicyclic and/or aromatic polyisocyanate can be used as the isocyanate. Examples of suitable polyisocyanates are diisocyanates, such as hexamethylene diisocyanate, isophorone diisocyanate, cyclohexane 1,4-diisocyanate, toluylene diisocyanate and diphenylmethane 4,4'-diisocyanate, triisocyanates, such as biuretized or isocyanurated hexamethylene diisocyanate, and the adduct of 3 moles of toluylene diisocyanate with 1 mole of trimethylolpropane. Even isocyanate prepolymers, for example adducts of diisocyanates with polyesterpolyols or polyetherpolyols, can be used as polyisocyanates.

Suitable secondary monoamines are especially secondary aliphatic, cycloaliphatic or araliphatic amines with a boiling point of less than 200° C., preferably with a boiling point of from 100° to 200° C. Examples of suitable secondary aliphatic amines are dimethylamine, diethylamine, dipropylamine, dibutylamine, dipentylamine, dihexylamine and isomers thereof, such as diisopropylamine, including asymmetrical isomers, such as N-ethyl-1-propanamine. Examples of suitable cycloaliphatic and araliphatic amines are dicyclohexylamine and N-methylaniline respectively. Polyalcohols having two or more hydroxyl groups may be used in addition. These polyalcohols can be low molecular weight, defined compounds, such as butane-1,4-diol or hydrogenated bisphenol A, but it is also possible to use polymeric alcohols, for example polyesterpolyols or polyetherpolyols having a molecular weight of not more than 10,000.

The subcomponents (a) (b) and (c) are used in such amounts that the total number of equivalents of (b) and (c) is not less than equal to the equivalents of (a). If the total number is greater, this gives products which still contain free hydroxyl groups; in general, however, the total number of equivalents of (b) and (c) will be chosen to be about equal to the equivalents of (a).

The reaction is carried out under the conditions customary for isocyanate reactions, namely (a), (b) and (c) can be added in any order, and the reaction temperature can range from room temperature to about 150° C. If the starting materials and the reaction product are liquid at the reaction temperature, the reaction can be carried out in the absence of a solvent, but in general the reaction will be carried out in an inert solvent, such as an ether, ester, ketone or hydrocarbon.

Component (B) is generally used in an amount of from 5 to 70, preferably from 15 to 40, % by weight of the total amount of the binder mixture of (A)+(B).

To prepare the surface-coating agents according to the invention, components (A) and (B) are mixed with each other. If the components are of low viscosity, the mixing can take place in the absence of a solvent, if appropriate by heating the mixture to not more than 130° C. Before relatively viscous products are mixed with each other, they are dissolved in conventional organic solvents, e.g. alcohols, ketones, esters, ethers, hydrocarbons etc.

The surface-coating agents according to the invention, in the presence or absence of pigments, auxiliaries and hardening catalysts, can be applied to such substrates as wood, plastic or metal by a conventional method, such as spraying, dipping, casting and knife-coating. To prepare powder finishes, components (A) and (B) which are both solid and solvent-free and whose softening points should in each case be >60° C., in order to avoid blocking, are dry-milled and mixed with customary additives, such as pigments, fillers and leveling agents, for example those based on polyacrylate. The mixtures are then homogenized at about 100° C. in the melt (extruder). After the extrudates have cooled down to room temperature they are thoroughly milled. Coarse fractions (above 70 μm) are sieved off. The powder finishes are customarily applied by electrostatic powder spraying.

Products which, by virtue of their amino content, become water-dispersible on neutralization with acids, for example acetic acid, can also be employed in the form of an aqueous dispersion. Products of this type are advantageously used for electrocoating electrically conductive substrates, e.g. metal components, sheets or the like of brass, copper, or aluminum, metallized plastics or materials which have been coated with conductive carbon, and iron and steel which may have been chemically pretreated, for example phosphatized. To prepare an electrocoating bath, an acid, e.g. formic acid, acetic acid or lactic acid, is stirred into the surface-coating agent to neutralize at least some of the amino groups, and the mixture is diluted with water to the use concentration. If the surface coating is to be applied by the EPC (Electro Powder Coating) process in place of the normal cathodic electrocoating process, component (B) is advantageously used in the form of a powder and component (A) in the form of a water-dispersible carrier resin, and the products used as component (B) have to be solid at room temperature.

A cathodic electrocoating bath is generally made up with a solids content of from 5 to 30 % by weight. The deposition process customarily takes place at 15°–40° C. in the course of from 1 to 5 minutes at pH 4.0–8.5, preferably pH 5.0–7.5, and at deposition voltages of from 50 to 500 volts. The electrically conductive body to be coated is connected as the cathode. The deposited film is hardened at above 130° C. in the course of about 20 minutes.

The following examples illustrate the invention without limiting its scope. Parts and percentages are by weight, unless indicated otherwise.

Preparation of component (A)

Component $A_1$:

0 parts of hexamethylenediamine are heated to 80° C. An 80% strength solution of 400 parts of a commercially available epoxy resin based on 2,2-bis-(4-hydroxyphenyl)- propane and having an epoxide equivalent weight of 500 in toluene is then added. Following an initially exothermic phase, the reaction is completed at 100° C. in the course of 30 minutes. Excess hexamethylenediamine and toluene are then distilled off under reduced pressure of 15 mbar at an internal temperature as high as 180° C. The remaining traces of free amine are then drawn off at 2.5 mbar and 180° C. in a thin-film evaporator. The product has an amine number of 169 mg of KOH/g and a softening point of 95° C.

Component $A_2$:

200 parts of component $A_1$, 30 parts of dimerized fatty acid and 20 parts of xylene are gradually heated to 190° C., water being separated off, and are held at this temperature for one hour. When the mixture has cooled down to 130° C., it is diluted, first with 9 parts of butylglycol and then with 70 parts of isobutanol. The product has a solids content of 70%.

Preparation of component (B)

1 equivalent of the particular polyisocyanate is taken and diluted in sufficient isocyanated solvent that the end product has a concentration of 50%. The secondary amine, with or without the polyol, is added at 80° C. with stirring and the exclusion of moisture in the course of 30 minutes. The mixture is then stirred at 80° C. until an NCO value of less than 1 has been reached.

TABLE 1

| Component B | 1 equivalent of polyisocyanate | Solvent | Amine [mol] | Polyol [Equivalent] |
| --- | --- | --- | --- | --- |
| $B_1$ | HDI | Toluene | 1 DBA | — |
| $B_2$ | BHDI | Dioxane | 1 DBA | — |
| $B_3$ | IHDI | Dioxane | 1 DBA | — |
| $B_4$ | TDI | Toluene | 1 DHA | — |
| $B_5$ | TMPTDI | Toluene | 1 DBA | — |
| $B_6$ | IPDI | Dioxane | 1 DBA | — |
| $B_7$ | IHDI | Toluene | 0.7 DBA | 0.3 HDL |
| $B_8$ | TMPTDI | Toluene | 0.7 DBA | 0.3 NPDL |

Abbreviations:
HDI = hexamethylene diisocyanate
BHDI = biuretized hexamethylene diisocyanate, 21.9% of NCO
IHDI = isocyanurated hexamethylene diisocyanate, 22% of NCO
TDI = toluylene diisocyanate, mixture of 80% of 2,4- and 20% of 2,6-isomers
TMPTDI = prepolymer of 1 mol of trimethylolpropane and 3 mol of toluylene diisocyanate
IPDI = isophorone diisocyanate
DBA = dibutylamine
DHA = dihexylamine
HDL = hexane-1,6-diol
NPDL = neopentyl-1,3-diol

EXAMPLE 1

Preparation of a Conventionally Applied White Finish 100 parts of component $A_1$, 120 parts of ethylglycol, 60 parts of butylglycol, 80 parts of titanium dioxide and 100 parts of component $B_2$ are mixed with one another by stirring and heating, and the mixture is then sand-milled to a DIN 53,203 particle size of <10 μm. The grinding medium is then separated off to leave a coating solution which has a solids content of 50% and which is knife-coated onto steel sheet in the form of a 100 μm thick wet film which is then baked at 140° C. in the course of 20 minutes into a very shiny, hard and resilient paint film which is completely resistant to acetone (100 rubs forwards and backwards with an acetone-impregnated cotton-wool pad).

The following examples demonstrate the use of the heat-curable surface-coating agents according to the invention in cathodically deposited electrocoatings:

EXAMPLE 2

100 parts of component $A_2$, 60 parts of component $B_2$ and 2.2 parts of acetic acid are mixed.

EXAMPLE 3

A binder is prepared by mixing 100 parts of component $A_2$ with 60 parts of component $B_3$. The binder is then made water-dilutable by adding 2.2 parts of acetic acid.

EXAMPLE 4

100 parts of component $A_2$ and 60 parts of component $B_5$ are intimately mixed. 2.3 parts of acetic acid are then added.

Testing the Binders

The acid-protonated binders are diluted with water to 10 % strength dispersions to be tested as cationic electrocoatings. 1,000 parts of each binder dispersion are admixed, by stirring, with 66 parts of a pigment paste which has been prepared as follows:

Pigment paste:

A paste binder is prepared as described in Example 1(a) of German Laid-Open Application DOS No. 3,121,765, namely by heating 200 parts of ethylene glycol monobutyl ether to 90° C. in a reaction vessel, then adding dropwise a mixture of 396 parts of N-vinylpyrrolidone, 204 parts of vinyl propionate and 1.2 parts of azobisisobutyronitrile in the course of 2 hours, and finally polymerizing at 90° C. for 1 hour. The resulting solution polymer has a Fikentscher K value of 24. The solids content of the copolymer solution is 76%.

250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads having a diameter of 2 mm are stirred at 1,000 r.p.m. for 45 minutes in a stirred ball mill. The glass beads are then separated off to leave a black paste having a solids content of 50.6%.

The baths are then stirred at 30° C. for 48 hours. Paint films are deposited at the voltage shown in Table 2 in the course of 2 minutes onto zinc-phosphatized steel test panels connected as the cathode, and are baked at 180° C., at 160° C. and at 140° C. for 20 minutes. Thereafter the baked films are tested for resistance to acetone by rubbing them backwards and forwards 50 times with an acetone-impregnated cottonwool pad, and the resilience is examined in the form of a reverse impact test. The following table shows the results.

TABLE 2

| | Results of the binder test with a film thickness of 17 μm | | | |
|---|---|---|---|---|
| Coating bath of | Ford throwing power at voltage | Acetone resistance at baking temperature | Reverse impact in × lb | Rust bleeding at the crack after 500 hours of ASTM salt spray exposure |
| Example 2 | 19.5 cm (250 V) | 160° 1 | 160 | 0.5 mm |
| | | 140° 1 | 160 | 0.7 mm |
| Example 3 | 21 cm (280 V) | 160° 1 | 160 | 0.3 mm |
| | | 140° 1 | 160 | 0.5 mm |
| Example 4 | 22 cm (300 V) | 160° 1 | 160 | 0.4 mm |
| | | 140° 1 | 160 | 0.5 mm |

Acetone resistance value 1: unassailable

We claim:

1. A heat-curable surface-coating agent which contains, as a binder, a mixture of (A) one or more polyadducts, polycondensates or other polymers having an average molecular weight $M_n$ of from 500 to 10,000 and, per molecule, on average two or more OH or primary or secondary amino groups, or two or more OH and primary or secondary amino groups, or two or more OH and primary and secondary amino groups, or two or more primary and secondary amino groups, with the proviso that component (A) is a reaction product of epoxy resins with alcohols, mercaptans or amines and (B) a reaction product of (a) one or more polyisocyanates, (b) one or more secondary monoamines and, (c) one or more polyalcohols having two or more hydroxy groups.

2. A surface-coating agent as defined in claim 1, which contains, as component (A), a reaction product of one or more aromatic or aliphatic epoxy resins or a mixture of aromatic and aliphatic epoxy resins and one or more primary, secondary or tertiary monoamines or polyamines or a mixture of one or more primary, secondary or tertiary monoamines and polyamines.

3. A surface-coating agent as defined in claim 1, which contains, as component (A), a polyadduct which carries basic nitrogen groups and, bonded to aromatic rings groups of the formula (I)

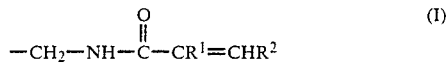

where $R^1$ and $R^2$ are identical or different and each is hydrogen or methyl.

4. A surface-coating agent as defined in claim 1, which contains, as component (A), a reaction product of phenolic Mannich bases and epoxy resins.

5. A heat-curable surface-coating agent as defined in claim 1, which contains, as component (A), a polyacrylate.

6. A heat-curable surface-coating agent as defined in any one of claims 1, 2 or 3 to 5, which is water-dilutable after partial or complete neutralization with an acid.

7. An aqueous cathodic electrocoating bath, which contains from 5 to 30% by weight of a surface-coating agent as defined in claim 6.

8. A surface-coating agent as defined in claim 1 whereby (B) is a reaction product of (a) and (b).

9. A surface-coating agent as defined in claim 8, which contains, as component (A), a polyadduct which carries basic nitrogen groups and, bonded to aromatic rings groups of the formula (I)

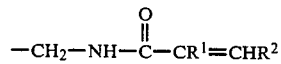

where $R^1$ and $R^2$ are identical or different and each is hydrogen or methyl.

10. A surface-coating agent as defined in claim 8, which contains, as component (A), a reaction product of phenolic Mannich bases and epoxy resins.

11. A heat-curable surface-coating agent as defined in claim 8, which contains, as component (A), a polyacrylate.

12. A heat-curable surface-coating agent as defined in claim 8, which is water-dilutable after partial or complete neutralization with an acid.

13. An aqueous cathodic electrocoating bath, which contains from 5 to 30% by weight of a surface-coating agent as defined in claim 12.

* * * * *